(12) United States Patent
Gabelmann

(10) Patent No.: US 6,918,403 B2
(45) Date of Patent: Jul. 19, 2005

(54) TIRE VALVE FOR THE RIM OF A PNEUMATIC TIRE ON A VEHICLE

(75) Inventor: Volker Gabelmann, Niederstotzingen (DE)

(73) Assignee: Alligator Ventilfabrik GmbH, Giengen (DE)

(*) Notice: Subject to any disclaimer, the term of this patent is extended or adjusted under 35 U.S.C. 154(b) by 361 days.

(21) Appl. No.: 10/106,553

(22) Filed: Mar. 25, 2002

(65) Prior Publication Data

US 2002/0134428 A1 Sep. 26, 2002

(30) Foreign Application Priority Data

Mar. 26, 2001 (DE) ..................... 201 05 319 U
May 18, 2001 (DE) ..................... 201 08 389 U

(51) Int. Cl.[7] .............................................. F16K 15/20
(52) U.S. Cl. ............... 137/119.08; 137/224; 152/339.1; 152/415
(58) Field of Search ................. 137/118.06, 119.01, 137/119.03, 119.08, 119.09, 224, 225; 152/339.1, 340.1, 341.1, 342.1, 415, 427

(56) References Cited

U.S. PATENT DOCUMENTS

| | | | | |
|---|---|---|---|---|
| 1,729,469 A | * | 9/1929 | Anderson | .............. 137/224 |
| 2,122,740 A | * | 7/1938 | Eckenroth | .............. 152/342.1 |
| 2,167,398 A | * | 7/1939 | Tubbs | .............. 137/225 |
| 2,969,824 A | * | 1/1961 | Howard | .............. 152/340.1 |
| 3,065,763 A | | 11/1962 | Howard | |
| 3,331,384 A | * | 7/1967 | Moore | .............. 137/119.08 |
| 3,536,119 A | * | 10/1970 | Mayer | .............. 152/427 |
| 3,911,988 A | * | 10/1975 | Richards | .............. 152/427 |
| 4,051,767 A | * | 10/1977 | Landsberg | .............. 137/119.08 |

FOREIGN PATENT DOCUMENTS

| | | |
|---|---|---|
| CH | 20320 | 9/1899 |
| DE | 37 11 785 | 10/1988 |
| DE | 200 15467 | 2/2001 |
| EP | 0751 017 | 1/1997 |
| SU | 638498 | 12/1978 |

* cited by examiner

Primary Examiner—John Rivell
(74) Attorney, Agent, or Firm—Bachman & LaPointe, P.C.

(57) ABSTRACT

In a tire valve for the rim (10) of a pneumatic tire on a vehicle comprising a valve body (14) of a rigid material and a valve insert (60) and an air outlet (51), which is disposed at a spacing in relation thereto, of a flow path (48, 50), a slider or plunger (44) including the flow path (48, 50) is mounted movably in the valve body (14) and the flow path is adapted to be connected at one end selectively to one of at least two air outlets (62, 64) provided on the valve body. The cup-like valve body (14) which comprises rigid material, in particular a metal material, has a wall (16) and a bottom plate portion (17). In addition the plunger (44) is to be provided with the valve insert (60).

20 Claims, 2 Drawing Sheets

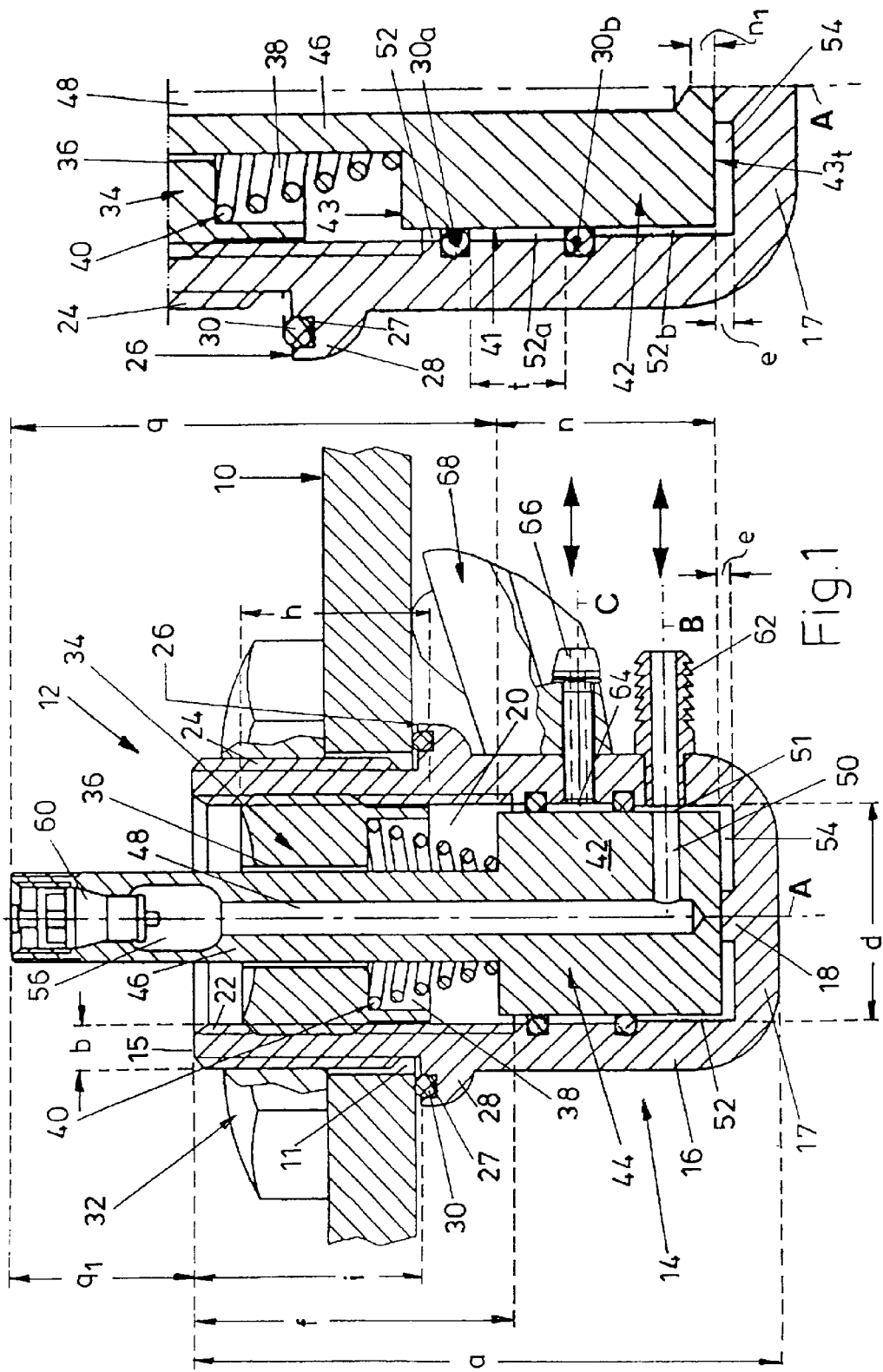

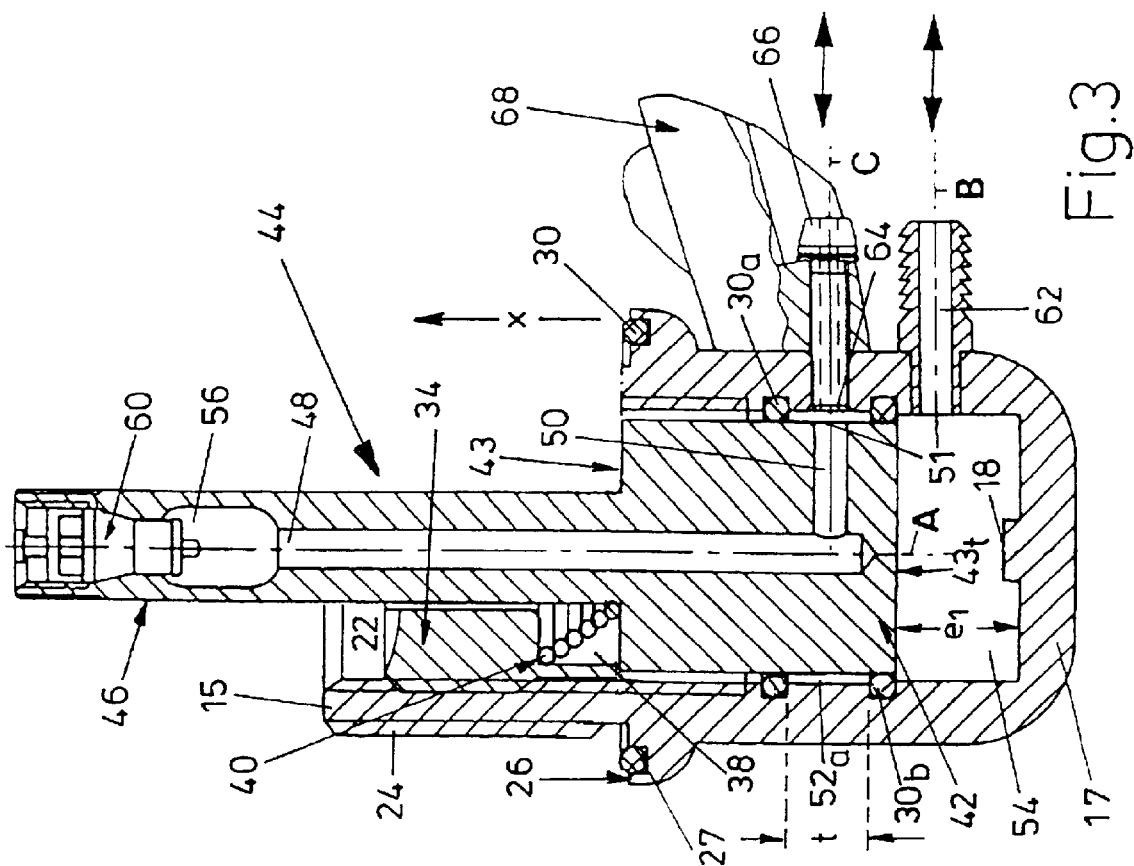

TIRE VALVE FOR THE RIM OF A PNEUMATIC TIRE ON A VEHICLE

The invention concerns a tire valve for the rim of a pneumatic tire on a vehicle comprising a valve body of a rigid material and a valve insert and an air outlet, which is disposed at a spacing in relation thereto, of a flow path.

Such a tire valve is to be found in the specification of DE 200 15 467 U1. In that arrangement, the valve body which includes a longitudinal bore is connected at a spacing by an intermediate tube to a coaxial valve casing or sleeve of rigid material—in particular a metal material—and the valve casing or sleeve can be limitedly inclined with respect to the longitudinal axis of the tire valve. The intermediate tube bears clampingly at one end against a hollow shaft portion of the valve body and at the other end surrounds the end region, which is in adjacent spaced relationship, of the valve casing or sleeve. The mouth opening of the longitudinal bore is arranged at a head tube of a hollow shaft portion, the head tube delimiting an annular shoulder towards the axis. The valve body is at least partially surrounded by a screw casing or sleeve which extends at a radial spacing relative to an external ridge or bead on the hollow shaft portion and forms therewith a clamping pairing for the intermediate tube. A ring of elastic material as a support member for the rim extends between the annular shoulder of a valve base provided at one end, and the oppositely disposed lower edge of the screw sleeve; provided between the lower edge of the screw sleeve and the elastic ring is an annular disk of rigid material.

EP 0 751 017 B1 to the present applicants describes a tire valve whose metal valve body includes a valve insert and terminates at a spacing relative to the rim at a valve cap. By virtue of a male screwthread, the valve body can receive a screw sleeve, between which and the annular shoulder of the valve base formed thereon the rim is clamped. The tire valve terminates within the rim in a signal housing which has two base elements for fitting on to the rim bed and for adjustable mounting in the assembled condition. The connecting element between the tire valve and the signal housing is in the form of a screw which is of a hollow configuration and which engages into the valve bore of the tire valve which bears with the annular shoulder against a seat in the signal housing, wherein the head of the screw bears at the side remote from the valve against a longitudinal wall of the signal housing, through which it passes with clearance.

In the commercial vehicle sector, a usable replacement for twin tires on the drive axle is being sought, for example by virtue of using what are referred to as 'SuperSingle' tires. The emergency running system installed in that tire is a safety tube which is also air-filled and by virtue of which it is still possible to continue moving on that safety system, in the event of a tire defect. That requires two separate air volumes to be filled.

In consideration of that state of the art, the inventor set himself the aim of so designing a tire valve of the kind set forth in the opening part of this specification that it can reach more than one air volume; the further aim is to provide that it can be used in the above-mentioned 'SuperSingle' tires with a safety tube.

That object is attained by the teaching of the independent claim; the appendant claims set forth advantageous developments. The scope of the invention also includes all combinations comprising at least two of the features disclosed in the description, the drawing and/or the claims.

In accordance with the invention, a slider or plunger which includes the flow path and which is provided with the valve insert is mounted movably in the cup-like valve body—which preferably has a wall and a bottom plate portion and is made from rigid material, in particular a metal material—and the flow path is adapted to be connected at one end optionally to one of at least two air outlets provided on the valve body.

In accordance with a further feature of the invention each of the air outlets is arranged in a separately sealed region of the internal space of the valve body and the mouth opening of the flow path, at the plunger side, is associated selectively with one of the regions by virtue of the relative movement between the plunger and the valve body. For that purpose, it has been found desirable to form from the plunger or slider on the one hand and the valve body surrounding same on the other hand, a clearance space which is parallel to the axis of the plunger and which is subdivided into the individual regions for the air outlets by sealing elements—which are arranged transversely with respect to the direction of movement of the plunger. The sealing elements are preferably O-rings which are inserted into grooves in the inside surface of the wall of the valve body at an axial spacing relative to each other and which project therefrom and along which the peripheral surface of the plunger—which peripheral surface includes the mouth opening of the flow path—is guided in touching or closely contacting relationship, with the mouth opening of the flow path being displaced within the valve body.

The wall of the valve body is preferably of an oval or cylindrical cross-section and the shape of the plunger—at least its portion associated with the sealing elements or O-rings—is adapted to that cross-section which extends around it; in accordance with the invention, the plunger can have a plunger body which is matched to the cross-section of the valve body and an axial tube of smaller cross-section which projects axially away therefrom and which includes the valve insert.

The flow path of the plunger or slider is to be formed by the internal space of the axial tube—in the form of an axial tubular passage, which is extended in the plunger body and which is closed towards the bottom face thereof, of the axial tube which is provided at the free end with the valve insert—and a radial bore which extends from that tubular passage.

In order always to maintain a spacing between the plunger or plunger body bottom portion and a bottom plate portion which is in one piece with the wall of the valve body, at least one abutment member for the bottom face of the plunger or the plunger body is to project up from the bottom plate portion at the inside, which abutment member however is of comparatively small height.

It has proven to be desirable if, in an end position—with the bottom face of the plunger or the plunger body bearing against the abutment member—the bottom space defined by that bottom face and the bottom plate portion, with the adjoining region of the clearance space, forms a unit which surrounds a part of the plunger body, in a cup-like configuration. Moreover, in that end position of the plunger or plunger body, the mouth opening of the flow path comprising the tubular passage and the radial bore is to be aligned with an air outlet or exit which is near the bottom and which is connected to a safety tube.

It is also in accordance with the invention if, in another position of the plunger, the plunger body is disposed at a spacing relative to the abutment member and the mouth opening of the flow passage comprising the tubular passage and the radial bore, in another region of the clearance space, is in opposite relationship to an air duct which is in communication with the interior of the tire; connected to the air duct is a device for monitoring the tire pressure, as is to be found for example in DE 296 23 466 to the present applicants.

Positional setting of the plunger body is effected by a force-storage means which bears against its head face and which is supported at its other end against a fixed counterpart surface. In particular the force-storage means can be a coil spring which extends around the axial tube and which at the other end is supported in a receiving space of a clamping nut. The counterpart surface or the clamping nut respectively is held by a female screwthread of the valve body in the internal space thereof, and the spacing of the clamping nut from the bottom plate portion of the valve body is adapted to be adjustable.

In accordance with a further feature of the invention provided on the valve body is a male screwthread for an outside nut which, with a radially protruding ridge portion on the valve body, forms a clamping means for fixing same to the above-mentioned rim. That ridge portion is intended to afford a radial abutment surface which includes a sealing element directed towards the nut—preferably an O-ring.

This invention ensures that the safety tube is always filled first. The lower outlet is connected by way of a flexible connection to the actual safety tube and is thus filled when the tire is pumped up. As soon as a certain pressure is reached—for example 9.5 bars—, the plunger is moved against the spring force into the upper position and the air duct to the tire is opened.

Any air pressures can be set in the tire, that is to say for example in the above-discussed 'SuperSingle' tire. As soon as the air pressure in the safety tube falls below the specified predetermined value the valve switches over to the connecting position to the safety tube so that in a subsequent inflation procedure at any event it is firstly inflated to the prescribed pressure value and it is only then that this is followed by the 'SuperSingle'.

Further advantages, features and details of the invention will be apparent from the description hereinafter of a preferred embodiment and with reference to the drawing in which:

FIG. 1 shows a view in longitudinal section through a tire valve according to the invention, FIG. 2 shows a portion from FIG. 1 on an enlarged scale, and FIG. 3 shows a part of the tire valve in a different operative position from FIG. 1.

Fixed to a rim 10 of a motor vehicle tire (not shown) is a tire valve 12—which passes through an opening 11 in the rim—, with a cup-shaped valve body 14 of a length a; the internal space 20 thereof, of an inside diameter d, is delimited by a cylindrical wall 16 of a thickness b and a bottom plate portion 17 which is in one piece therewith. Projecting therefrom on the axis A of the cylinder is an abutment projection 18 of small height e.

A female screwthread 22 extends in the wall 16 from the edge 15—which is chamfered on both sides—of the mouth opening of the valve body 14 or its wall 16. The length f of the female screwthread 22 is somewhat greater than half the length a of the valve body. Also provided in the wall 16 is a male screwthread 24 which extends between the edge 15 of the mouth opening and an abutment surface 26 which projects radially from the wall 16; the abutment surface 26 extends, relative to the edge 15 of the mouth opening, at a spacing i which corresponds to approximately two thirds of the length n of the female screwthread 22, and it is provided by a ridge portion 28 which is shaped in an annular configuration out of the outside surface of the valve body 14. Fitted in an annular groove 27 of the abutment surface 26 is an O-ring 30 which fits closely to the inside surface of the rim, in the illustrated installed position of the tire valve 12.

The male screwthread 24 is engaged with a polygonal nut 32 which, with that abutment surface 26 or the O-ring 30 therein, forms a clamping means for fixing the tire valve 12 in position.

Screwed into the female screwthread 22 is a clamping nut 34 of a height h, which has an axial passage 36 extending therethrough and which towards the bottom plate portion 17 includes a cylindrical receiving space 38 for a compression spring 40 which tapers conically out of same.

Arranged in the lower region of the internal space 20 of the valve is a plunger body 42—which is of a matching cylindrical configuration—of a plunger or slider 44, the head face 43 of which is subjected to the loading of the coil or compression spring 40 which extends around an axial tube 46 of the slider 44, the axial tube 46 projecting upwardly from the head face 43. The axial tube 46 of the length q extends through the axial passage 36 of the clamping nut 34 and projects out of the valve body 14 by a projection length $q_1$, even when—in the vented condition shown in FIGS. 1 and 2—the bottom face $43_t$ of the plunger body 42 is resting on the abutment projection 18 of the bottom plate portion 17.

The tubular passage 48 which is coincident with the axis A of the cylinder is extended in the adjoining plunger body 42 and terminates at a small spacing $n_1$ from the bottom face $43_t$. Near the end of the tubular passage 48, extending therefrom is a radial bore 50, whose mouth opening 51 is provided at the peripheral surface 41 of the plunger body 42. That peripheral surface 41, with the oppositely disposed inside surface of the wall 16, defines an annular space 52, of which an upper portion $52_a$ of a length t is sealingly delimited by two O-rings $30_a$, $30_b$. That length t is shorter than half the height n of the plunger body 42. In FIGS. 1 and 2 the lower O-ring $30_b$ defines a lower annular space portion $52_b$ which goes into a bottom space 54 surrounding the abutment projection 18.

Provided at the upper end of the axial tube 46 is a valve insert 60 which for example designed in accordance with DIN 7757 ends in an enlargement of the tubular passage 48, said enlargement forming a hollow space 56.

The tire valve 12 is intended for a tire which as an emergency system includes a safety tube which is also filled with air, in order to permit the vehicle to continue to travel on that safety system in the event of a tire defect. Filling of those two separate air volumes is to be effected by way of the described valve 12.

When the tire 1 is first fitted, its tire valve 12 is in the position shown in FIG. 1, in which the radial bore 50 extends on the longitudinal axis B of the outlet which is the lower outlet in FIG. 1, as a tube connection 62 for the safety tube (not shown). This therefore ensures that in any case it is the safety tube that is filled first; the lower outlet 62 is connected by way of a flexible connection to the actual safety tube and is thus filled in the inflation procedure. As soon as a certain pressure is reached—preferably for example 9.5 bars—the plunger body 42 is moved against the spring force in the direction of the arrow x into an upper position as indicated in FIG. 3, in which the spacing $e_1$ of the bottom face $43_t$ of the plunger body 42 from the bottom plate portion 17 of the valve body 14 measures a multiple of the height e of the abutment projection 18, and the air duct 64 to the tire, which is associated with the upper portion $52_a$ of the annular space 52, is opened. In FIGS. 1 and 3, the electronic system 68 for tire pressure monitoring is fixed to that air duct 64—longitudinal axis C—by a hollow screw 66.

Any desired air pressures can be set in what is to referred to as a 'SuperSingle' tire. As soon as the air pressure in the safety tube falls below the predetermined value—in this case 9.5 bars—the valve 12 switches to the connecting condition for connection to the safety tube so that in the subsequent re-inflation procedure the latter is firstly inflated to the prescribed pressure value and it is only thereafter that the 'SuperSingle' can be inflated.

What is claimed is:

1. A tire valve comprising a valve body having an internal space, a slider or plunger movably mounted in the internal space wherein the slider or plunger defines with a wall of the valve body a clearance space, a pair of sealing elements disposed in the clearance space for subdividing the clearance space into a first sealed region and a second sealed region, first air outlet communicating with the first sealed region and a second air outlet communicating with the second sealed region, the slider or plunger having a flow path having an outlet which selectively communicates with the first air outlet and the second air outlet and an inlet to the flow path, and a valve insert which communicates with the inlet to the flow path.

2. A tire valve as set forth in claim 1, wherein the valve body is a cup-like valve body formed of a rigid material having a wall and a bottom plate portion.

3. A tire valve as set forth in claim 2, wherein the sealing elements comprise O-rings inserted into an inside surface of the wall of the valve body at a spacing (t) relative to each other and project therefrom, wherein a peripheral surface of the slider or plunger includes a mouth opening for the flow path.

4. A tire valve as set forth in claim 2, wherein the wall of the valve body is oval or cylindrical in cross-section and at least a portion of the slider or plunger, which is associated with the sealing elements, has a shape which is matched to said cross-section.

5. A tire valve as set forth in claim 1, wherein the slider or plunger has a plunger body which is matched to a cross-section of the valve body and an axial tube of smaller cross-section which projects axially away from said plunger body.

6. A tire valve as set forth in claim 5, wherein the flow path is formed in part by an internal space in the axial tube and a part of the internal space which is extended in the plunger body and is closed at a, bottom face, and a radial bore extends from said internal space.

7. A tire valve as set forth in claim 5, wherein the valve insert is arranged at a free end of the axial tube.

8. A tire valve as set forth in claim 2, wherein at least one abutment member for a bottom face of the slider or plunger projects on the inside from the bottom plate portion which is formed in one piece with the wall of the valve body.

9. A tire valve as set forth in claim 8, wherein the abutment member projects from the bottom plate portion a height (e) toward the slider or plunger.

10. A tire valve as set forth in claim 9, wherein the bottom face of the slider or plunger rests on the abutment member, wherein a bottom space is delimited by the bottom face and the bottom plate portion and communicates with one sealed region of the clearance space.

11. A tire valve as set forth in claim 3, wherein in an end position of the slider or plunger the mouth opening of the flow path comprising a tubular passage and a radial bore which is aligned with one of the air outlets which is connected to a safety tube.

12. A tire valve as set forth in claim 6, wherein in another position of the plunger body is disposed at a spacing relative to an abutment member and the mouth opening of the flow path comprising the tubular passage and the radial bore in a region of the clearance space is in opposite relationship to an air duct to which the tire interior is connected.

13. A tire valve as set forth in claim 12, including means for tire pressure monitoring is connected to the air duct.

14. A tire valve set forth in claim 5, wherein a force-storage means rests on a head face of the plunger body, the force-storage means being supported at one end against a fixed counterpart surface.

15. A tire valve as set forth in claim 14, wherein the force-storage means comprises a compression spring which is in the form of a coil spring or a spiral spring and which extends around the axial tube and which is supported at the one end in a receiving space in a clamping nut.

16. A tire valve as set forth in claim 14, wherein the force-storage means is a coil spring which conically enlarges away from the plunger body.

17. A tire valve as set forth in claim 15, wherein the clamping nut is held by a female screwthread of the valve body in the internal space thereof.

18. A tire valve as set forth in claim 17, wherein a spacing of the clamping nut from the bottom plate portion of the valve body is adjustable.

19. A bottom plate portion as set forth in claim 1, wherein a male screwthread is provided on the valve body for an external nut having a radially protruding ridge portion.

20. A bottom plate portion as set forth in claim 19, wherein a radial abutment surface on the ridge portion contains a sealing element directed towards the external nut.

* * * * *